Oct. 30, 1923.

J. A. BROGAN 1,472,044

METHOD AND APPARATUS FOR PRODUCING NAIL STRINGS

Filed March 22, 1920

INVENTOR
James A. Brogan

Oct. 30, 1923.

J. A. BROGAN 1,472,044

METHOD AND APPARATUS FOR PRODUCING NAIL STRINGS

Filed March 22, 1920  9 Sheets-Sheet 4

INVENTOR.
James A. Brogan

Oct. 30, 1923.

J. A. BROGAN 1,472,044

METHOD AND APPARATUS FOR PRODUCING NAIL STRINGS

Filed March 22, 1920

INVENTOR
James A. Brogan

Oct. 30, 1923.

J. A. BROGAN 1,472,044

METHOD AND APPARATUS FOR PRODUCING NAIL STRINGS

Filed March 22, 1920      9 Sheets-Sheet 7

INVENTOR.
James A. Brogan

INVENTOR
James A. Brogan

Patented Oct. 30, 1923.

1,472,044

UNITED STATES PATENT OFFICE.

JAMES A. BROGAN, OF LAWRENCE, MASSACHUSETTS, ASSIGNOR TO UNITED SHOE MACHINERY CORPORATION, OF PATERSON, NEW JERSEY, A CORPORATION OF NEW JERSEY.

METHOD AND APPARATUS FOR PRODUCING NAIL STRINGS.

Application filed March 22, 1920. Serial No. 367,751.

*To all whom it may concern:*

Be it known that I, JAMES A. BROGAN, a citizen of the United States, residing at Lawrence, in the county of Essex and State of Massachusetts, have invented certain Improvements in Methods and Apparatus for Producing Nail Strings, of which the following description, in connection with the accompanying drawings, is a specification, like reference characters on the drawings indicating like parts in the several figures.

This invention relates to methods and apparatus for producing nail strings and has for its object to enable them to be manufactured more cheaply and economically than has heretofore been possible.

It has been the usual practice to manufacture nail strings from relatively thin, flat, metal strips of substantially uniform width and thickness by dieing out portions of the strips at equally spaced intervals along the strips to form the shanks of the nails in the nail strings, the intermediate, unreduced portions of a strip constituting the heads of the nails. This method is very wasteful inasmuch as the pieces of metal required to be removed from the strips constitute a very considerable part of the strip, and no use has been found for them in the arts.

An important feature of this invention consists in making a nail string from a strip of nail stock by forming bends in the strip at spaced intervals along the strip, such bends constituting the heads of the nails in the nail string and consisting of portions extending outwardly from the strip and joined at their outer ends. After a bend has been formed in a strip, which may be in the form of iron or brass wire, it is desirable that the nail stock be pressed together at the bend so as to double or fold it upon itself in order that the portions of the head of the nail constituted by the bend may mutually support each other, thus providing a head adequate to withstand driving force and of large holding power. In the present instance of the invention, after a bend has been formed in the strip and before the stock is pressed together at the bend, the part of the strip on one side of the bend is displaced laterally of the part on the other side of the bend, thus turning one portion of the bend with relation to the other, with the result that when the stock is pressed together at the bend, the portions of the bend are caused to be disposed in a plane transverse to the length of the strip. After the head of a nail in the nail string has been formed, a portion of the strip adjacent to the head is preferably cut away in order to assist in forming a point on the entering end of the next adjacent nail in the nail string. It will be manifest that a much smaller proportion of the strip is required to be cut away to form points on the nail shanks than is required to be removed in the manufacture of string nails by former methods in which the entire shanks of the nails were formed by cutting out portions from the strip.

The heads of the nails in the nail string are spaced at some distance from each other in order to provide for the nail shanks. Moreover, the heads of the nails preferably extend from one side only of the nail string. Accordingly, in another aspect, the invention contemplates exerting a swaging pressure at spaced points along one side of a strip of nail stock to cause portions of the strip, in the form of bends or otherwise, to be offset from the other side of the strip at intervals greater than the distance between the angles formed by the offset portion and the strip.

In accordance with further features of the invention, mechanism is provided for forming bends of the character above described at spaced intervals along a strip. In the present embodiment of the invention, such mechanism is designed to double or fold the strip upon itself at spaced intervals and comprises two pairs of grippers and a bender operable upon the strip between the grippers and while it is clamped by the grippers. The grippers are operated to turn one portion of the bend with relation to the other and then to press the nail stock together at the bend and a cutter is provided for removing portions of the strip adjacent to and rearwardly of the bends to form points on the shanks of the nails.

It is recognized that certain features of the mechanism devised by me for making nail strings are not limited to such use but may be employed in other relations. It is, therefore, intended that the scope of the invention shall not be restricted except as required by the claims.

Other objects and features of the invention will appear as the description proceeds and will be pointed out in the appended claims.

Figure 1:
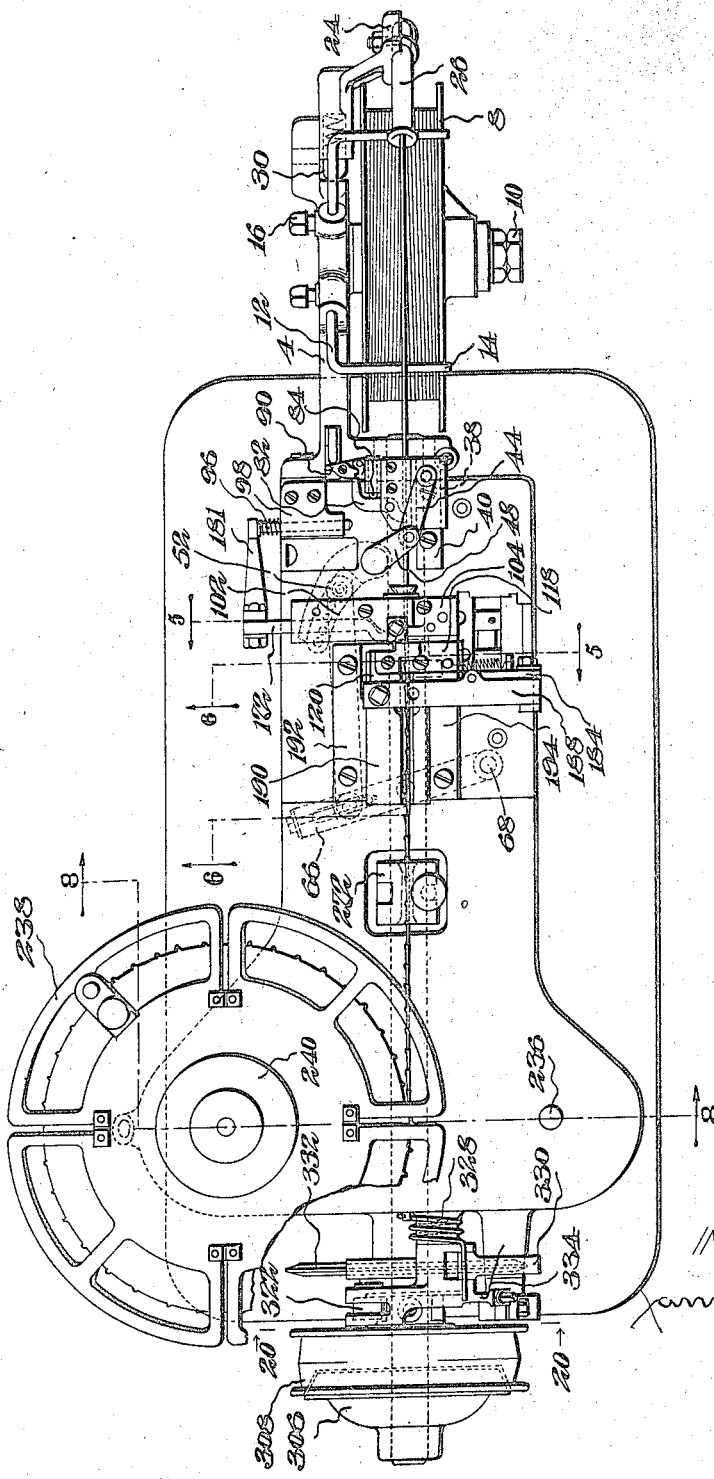
Fig. 1 is a view in plan of a machine according to the invention.

The illustrated machine exemplifies one form of means for carrying out my improved method of making nail strings. Preferably, and, as shown, it is designed to form the nail strings from wire and comprises a frame 2 to which is detachably secured a bracket 4 having a shaft 6 extended laterally therefrom. The shaft 6 is adapted to support the wire reel 8 which may be retained on the shaft by any suitable means as, for example, a nut 10. Rods 12 mounted on the bracket 4 are formed with transversely extending portions 14 which embrace the reel at spaced intervals. The portions 14 of the rods 12 lie close to the periphery of the reel and prevent the escape of loops of the wire over the sides of the reel. The rods 12 are seated in openings in the bracket 4 and may be secured in those openings by set screws 16.

In order to enable it to be fed uniformly to the machine, I provide a tension device for the wire including an arm 18 fulcrumed at 20 on an extension 22 projecting downwardly and outwardly from the bracket 4. The arm 18 is provided on its upper end with a block 24 to which is secured a tube 26 through which the wire passes on its way from the reel 8 to the nail string forming devices of the machine. To the end that any slack in the wire may be taken up by the guide tube 26, a spring 28 seated in the arm 18 presses against a plunger 30 disposed for engagement with a plane surface 32 on the extension 22 of the bracket 4. The outward movement of the arm 18 under the influence of the spring 28, is limited by a finger 34 arranged to strike against a boss 36 on the projection 22 of the bracket 4.

Figure 2:
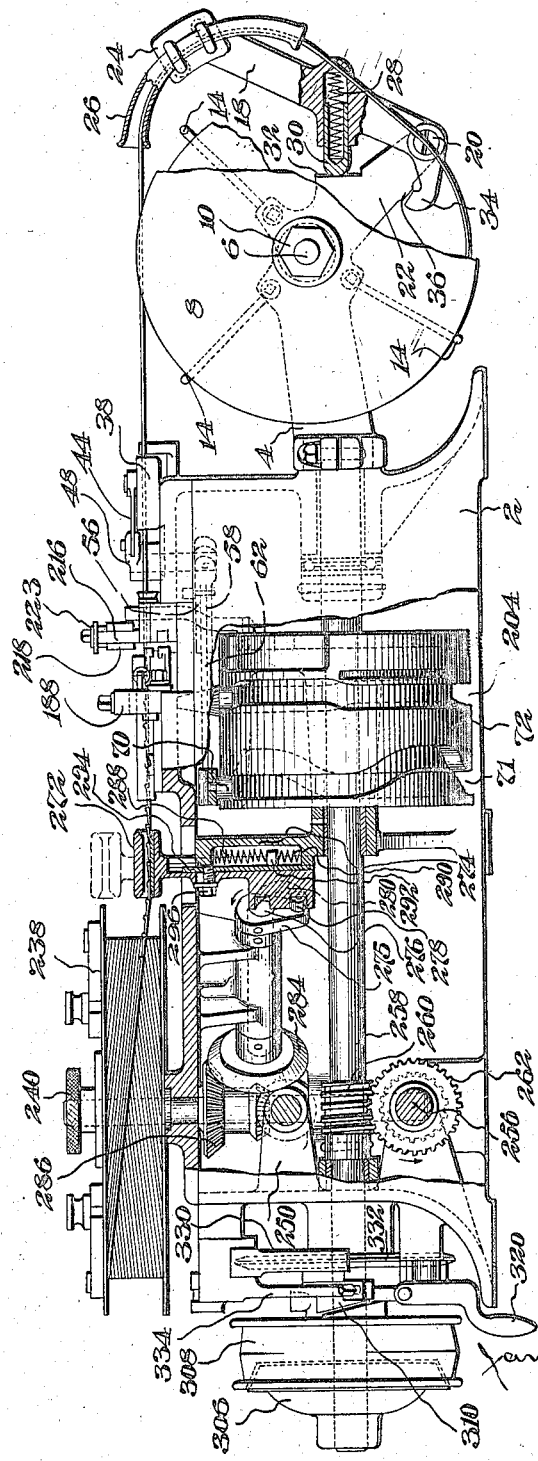
Fig. 2 is a view in elevation looking from the front of Fig. 1 and partly in cross-section.
Figure 3:
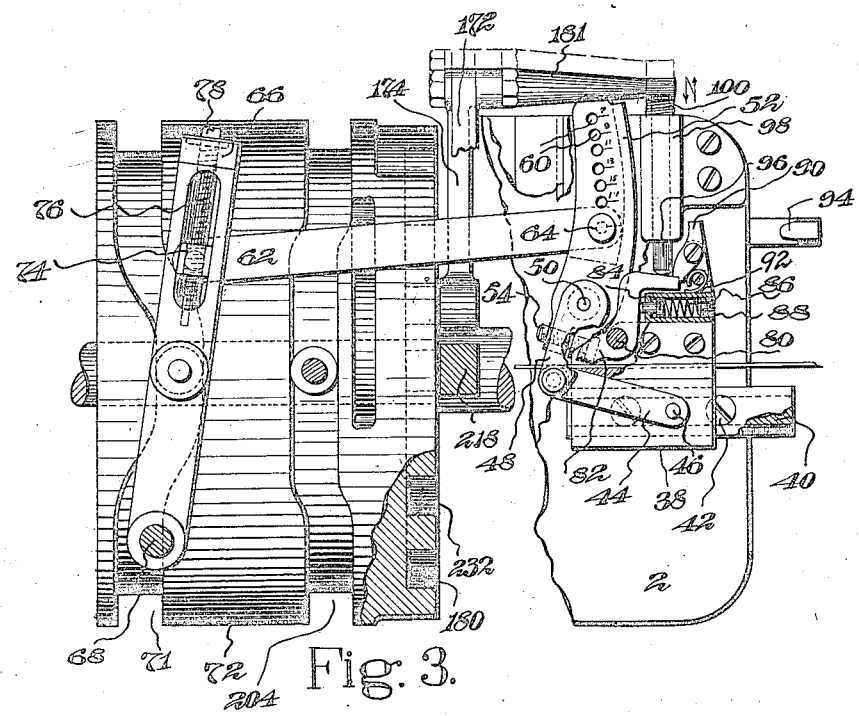
Fig. 3 is a plan view on an enlarged scale of the wire feeding mechanism.

The wire is fed intermittently to the devices for forming it into a nail string by a reciprocating slide 38 (Fig. 3) dove-tailed on a bar 40 secured to the top of the frame 2 in any suitable manner, as by means of screws 42. The slide 38 is reciprocated on the bar 40 by a link 44 having one of its ends connected to the slide 38 at 46 and its other end joined to an arm 48 on a shaft 50 journaled in the top of the frame 2 of the machine. The shaft 50 is operated by an arm 52 clamped onto the lower end of the shaft by a screw or the like 54. As shown, the arm 52 is provided with a slot partially dividing it horizontally into two parts 56 and 58 (see Fig. 2). The parts 56 and 58 are formed with alined openings 60 and are arranged to receive between them one end of a link 62 which may be secured to the arm 52 by means of a pin 64 adapted to be inserted into any one of the openings 60. The link 62 is connected at its other end to a lever 66 fulcrumed at 68 on the machine frame 2 and having a cam roll 70 received in a peripheral groove 71 formed in the main cam wheel 72 of the machine. In order that the range of feeding movement of the reciprocating slide 38 may be regulated with any desired nicety, the link 62 at its point of connection with the lever 66 is provided with a pivot block 74, through which is threaded a screw 76 rotatably mounted in the end of the lever 66. The screw 76 is preferably notched at its outer end as indicated at 78 to facilitate its rotation by a suitable tool.

The reciprocating slide 38 has fulcrumed thereon at 80 a dog 82 formed to present a corrugated surface arranged for engagement with the wire to clamp it against the opposed channeled face of the slide 38. The dog 82 is normally pressed into engagement with the wire by a stud 84 movable in an opening in the slide 38 and forced against the tail of the dog 82 by a spring 86 interposed between the head of the stud 84 and the inner surface of a screw plug or the like 88. To the end that the dog 82 may be retained out of engagement with the wire during the movement of the slide 38 away from the nail string forming devices of the machine, a pawl 90 is fulcrumed on the slide 38 and is formed with a shoulder which is normally pressed against the tail of the dog 82 by a bent spring 92. The dog 82 is released from its retaining means at the end of the movement of the slide 38 away from the nail string forming devices of the machine by a stop 94 supported on the frame 2 in position for engagement with the tail of the pawl 90. In order to move the tail of the dog 82 into operative relation with the pawl 90 upon the completion of the reverse or feeding movement of the slide 38, a plunger 96 is slidably mounted in a bracket 98 secured to the top of the machine frame 2 by screws or the like. A spring 100 interposed between the head of the plunger 96 and the opposed surface of the bracket 98 normally maintains the plunger 96 in outward position out of engagement with the tail of the dog 82. The plunger 96 is moved inwardly against the resistance of the spring 100 at the completion of the wire feeding movement of the slide 38 by means hereinafter to be described. When the plunger 96 is moved inwardly, it turns the dog 82 out of engagement with the wire, whereupon the end of the pawl 90 is thrust across the end of the dog by the spring 92.

Figure 4:
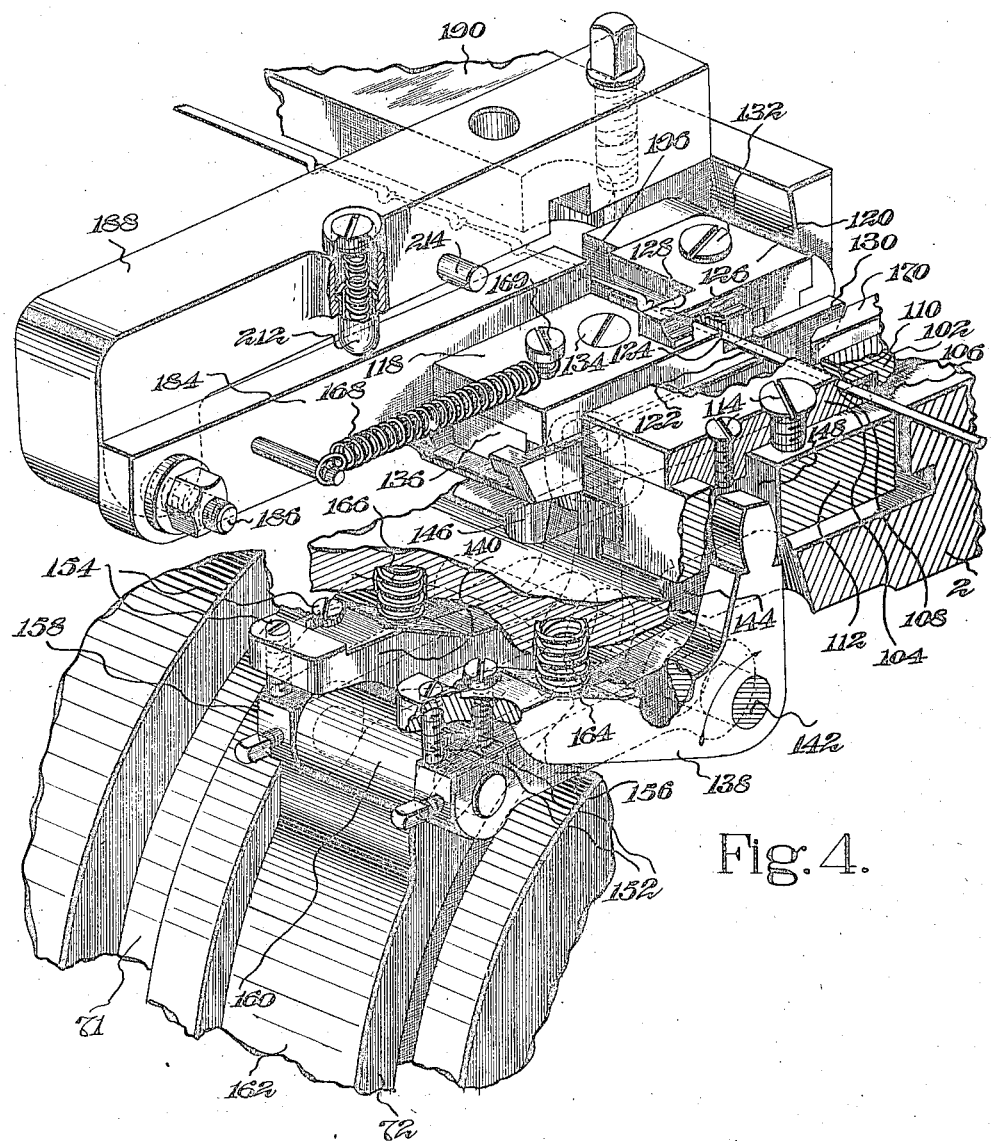
Fig. 4 is a view in perspective of the devices for forming the wire into a nail string.

The devices for forming the wire into nail strings comprise two pairs of gripper members, one of which consists of a stationary gripper 102 and a movable gripper 104 reciprocable toward and from the stationary gripper in a direction transverse to the path of movement of the wire through the machine. The forward edge of the movable gripper 104 has extending therefrom a reduced portion 106 adapted to underlie a part of the stationary gripper 102 and to support the wire when it is released by the grippers. In order to provide a channel for the wire, the forward edge of the movable gripper 104 is concaved adjacent to the upper surface of the extension 106 as indicated at 108 (Fig. 4). The stationary gripper 102 is provided with a face 110 inclined upwardly toward the forward edge of the movable gripper 102 so as to press the wire firmly into the channel of the gripper 104. The movable gripper 104 is carried by a sliding block 112 dovetailed into the top of the frame 2 of the machine. As shown, screws 114 secure the gripper 104 to the block 112.

A second pair of grippers 118, 120 is provided for engaging the wire at points spaced from the points of engagement of the wire by the grippers 102 and 104. The gripper 118 is movable toward and from the gripper 120 in a manner analogous to the movement of the gripper 104 toward and from the stationary gripper 102. As clearly appears from Fig. 4, the gripper 118 is provided on its forward edge with a reduced extension 122 underlying the wire and serving to support it when the grippers 118 and 120 are separated to permit it to be fed. The forward edge of the gripper 118 is provided with a concave channel 124 to receive the wire, this channel being spaced from the upper surface of the extension 122 for reasons hereinafter set forth. The wire engaging surface of the gripper 120 is preferably corrugated as shown at 126 (Fig. 4), and the gripper 120 is also preferably provided with an extension 128 roofing the space between the grippers 118 and 120 so as to prevent the wire from moving upwardly out of the field of action of the grippers. The grippers 118 and 120 are carried by a holder 130 to which the gripper member 120 is fixedly secured as by means of a screw 132 or the like, whereas the gripper 118 is secured by a screw 134 to a block 136 dove-tailed slidably in the holder 130 for movement toward and from the gripper 120. The grippers 104 and 118 are preferably moved toward and away from their opposed gripper members 102 and 120 substantially simultaneously. The means for effecting such movement of the grippers 104 and 118 preferably comprises levers 138 and 140 fulcrumed on a shaft 142 mounted on the machine frame. The levers 138 and 140 are provided with upstanding portions adapted to project through slots 144 and 146 in the top of the machine frame 2 into openings 148 and 150 respectively in the blocks 112 and 136. The levers 138 and 140 are provided at their outer ends with screws 152 and 154 respectively which engage arms 156 and 158 also pivoted on the shaft 142. With this construction, when the arms 156 and 158 are moved upwardly, the levers 138 and 140 will be correspondingly moved, thus forcing the gripper members 104 and 118 forwardly into clamping engagement with the wire. Upward movement of the arms 156 and 158 is effected by means of a roll 160 carried by the arms and riding on a cam track 162 on the cam wheel 72. The grippers 104 and 118 are moved outwardly away from the wire by springs 164 and 166 respectively interposed between the upper surfaces of the levers 138 and 140 and the lower surface of the top of the frame 2 of the machine. The action of the spring 166 in moving the gripper 118 away from the corresponding gripper 120 may be supplemented by a spring 168 acting on a pin 169 projecting upwardly from the gripper 118. The screws 152 and 154 enable the extent of advance of the grippers 104 and 118 toward the wire to be independently regulated.

Figure 5:
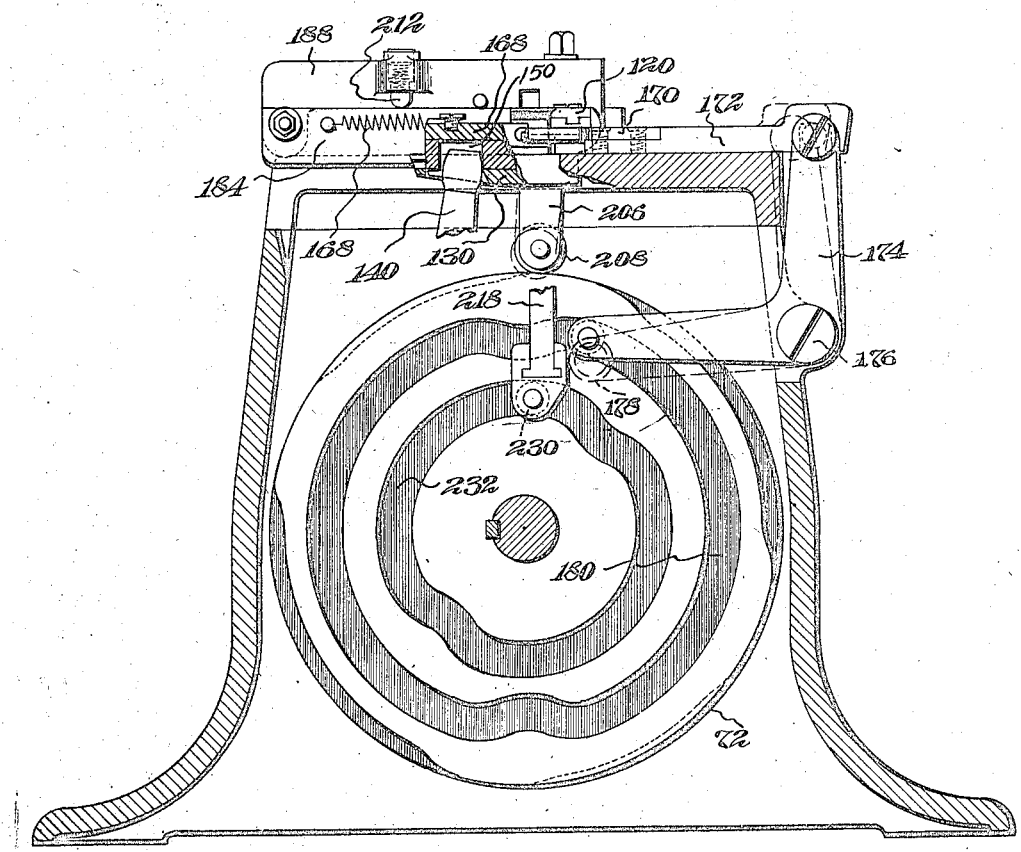
Fig. 5 is a view in cross-section taken substantially along the line 5—5 of Fig. 1 and looking in the direction of the arrows.
Figure 7:
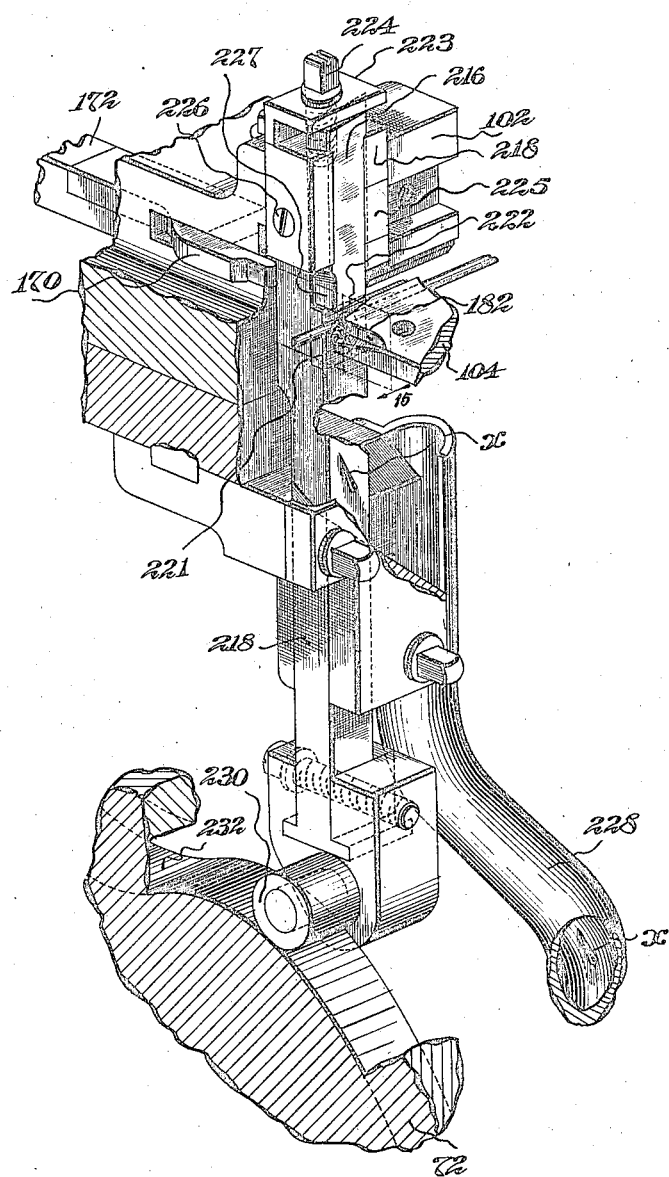
Fig. 7 is a cross-sectional elevation illustrating the bender and cutter in their relation to the gripper members.
Figure 12:
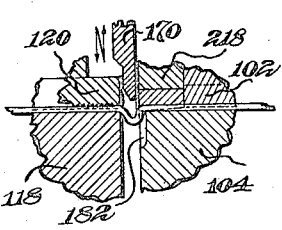

In order to offset portions of the wire at spaced intervals along the wire to form heads on the nails in the nail string a bender 170, best shown in Figs. 7 and 12, is arranged to operate on the wire between the points of engagement of the wire by the pairs of grippers 102, 104 and 118, 120. As shown, the bender 170 is carried by a bar 172 slidable on the top of the machine frame 2 and operated from the position shown in full lines in Fig. 5 to and from the broken line position by a lever 174 fulcrumed at 176 on the machine frame. The lever 174 derives its movement from a cam roll 178 riding in a cam groove 180 in the cam wheel 72. The lever 174 has secured thereto at its upper end a bar 181 disposed for engagement with the head of the plunger 96 when the bender 170 is moved inwardly against the wire. The bar 181 moves the plunger 96 against the tail of the dog 82 and turns the dog in opposition to the spring 86 out of engagement with the wire, the dog being retained in such position by the pawl 90 during the subsequent retrograde movement of the slide 38.

Figure 6:
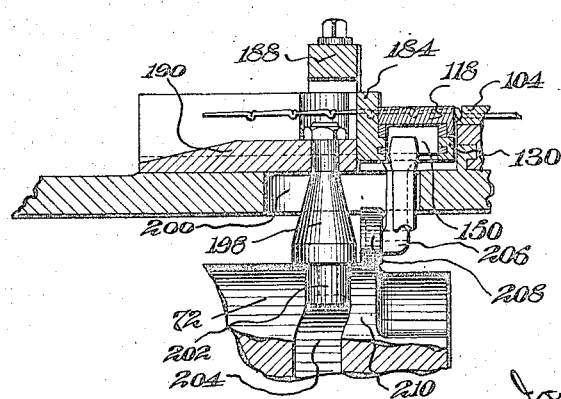
Fig. 6 is a view in cross-section taken substantially along the line 6—6 of Fig. 1 and looking in the direction of the arrows.
Figure 14:
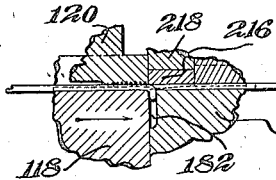
Fig. 14 is a view similar to Figs. 10 and 11 but showing the parts in different relative positions.
Figure 15:
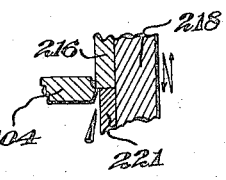
Fig. 15 is an elevational view in cross-section through the cutter and one of the gripper members taken in the plane indicated by broken lines 15 in Fig. 7 and illustrating the manner in which the cutter operates to form points on the shanks of the nails.

The side of the gripper 104 opposite the gripper 118 is formed with a recess 182 (Fig. 7) extending transversely of the path of movement of the wire through the machine. The bender 170 is disposed to operate on the side of the wire opposite from the recess 182 of the gripper 104 so as to bend the wire toward the recess. After a bend has been formed in the wire, it is desirable that the portions of the wire at the bend should be pressed together. In the present instance of the invention, this is accomplished by moving the pairs of grippers 102, 104 and 118, 120 toward each other so as to close the bend in the wire in the recess 182. To this end, the holder 130 is carried on the end of a bar 184 (Fig. 4) fulcrumed at 186 on a block 188 extending transversely from a slide 190 reciprocable on the top of the machine frame 2 between guiding members 192 and 194 (Fig. 1). The slide 190 has a stud 198 (Fig. 6) depending therefrom through an elongated slot 200 in the top of the machine frame 2. A roll 202 on the stud 198 rides in a cam groove 204 formed in the cam wheel 72. The opening 150 of the block 136 is elongated in the direction of movement of the slide 190 to allow the gripper 118 to be moved toward and away from the gripper 104. The cam groove 204 is so formed as to move the grippers 118 and 120 against the opposed sides of the grippers 102 and 104 so as to press the bend in the wire fully into the recess 182 of the gripper 104 as shown in Fig. 14.

If the slide 190 were moved toward and from the grippers 102 and 104 without movement of the grippers 118 and 120 with relation to the slide other than the movement of the gripper 118 to clamp and release the wire, the heads of the nails in the nail string would be formed by portions of the wire doubled upon each other in the plane of the nail string. It is now deemed preferable, however, that the offset portions of the wire constituting the heads of the nails in the nail string shall be bent in planes transverse to the length of the nail string. Accordingly, means is provided for moving the holder 130 which carries the grippers 118 and 120 vertically on the slide 190. As shown, such means comprises a member 206 (Fig. 6) depending from the holder 130 and having a cam roll 208 which rides on a cam track 210 formed on the cam wheel 72. The cam roll 208 is maintained against the periphery of the cam wheel 72 by a spring-pressed plunger 212, and a pin 214 may be provided to insure against excess upward movement of the holder. By moving the holder 130 upwardly about its pivot 186 subsequently to the formation of a bend in the wire by the bender 170, the portion of the wire in advance of the bend may be raised. The raising of the wire by the grippers 118 and 120 and the subsequent movement of the pair of grippers 118, 120 toward the pair of grippers 102, 104 causes the portions of the bend forming the angle of the bend to be disposed in a plane substantially at right angles to the length of the wire.

Figure 10:
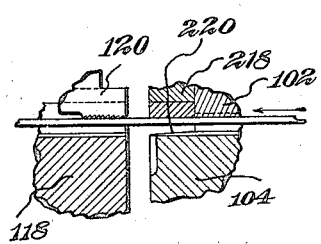
Figs. 10, 11 and 12 are plan views in cross-section of the pairs of gripper members and the elements associated with them for forming wire into nail strings.
Figure 11:
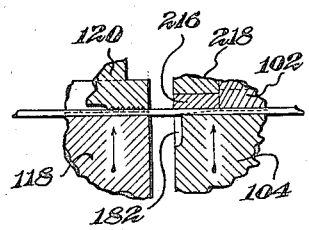
Figure 16:
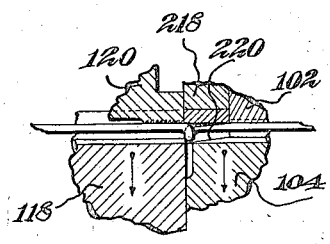
Figs. 16 and 17 are views similar to Figs. 10, 11 and 14 but illustrating the parts in the positions which they assume at other points in the cycle of operations of the machine.
Figures 17, 18:
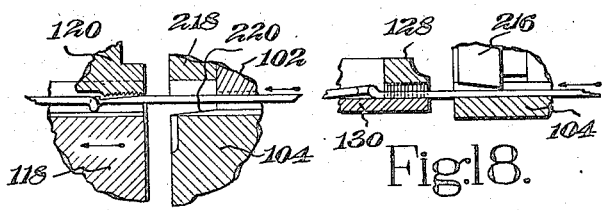
Figs. 18 and 19 are views similar to Fig. 13, illustrating the pair of gripper members at the left of said views in raised and lowered position respectively.

Means is preferably provided for removing portions of the wire between the offset portions to form points on the shanks of the nails in the nail string. In the illustrated machine, such means comprises a cutter plate 216 carried by a bar 218 mounted for vertical reciprocation in the machine frame 2. As shown most clearly in Fig. 7, the stationary gripper 102 is cut away in a manner to correspond with the cross-sectional dimensions of the bar 218 to receive the bar. The projection 106 of the gripper 104 is reduced opposite from the bar 218 (see Figs. 10, 16, and 17) to form a shoulder 220 tapering toward the side of the gripper 104 in which the recess 182 is formed. The bar 218 is provided below the cutter plate 216 with a wear plate 221 having a wire engaging face disposed substantially in line with the wire contacting portion of the surface 110 of the gripper 102 and acting to hold the wire firmly against the gripper 104. The cutter plate 216 is clamped down on the wear plate 222 by a cap 223 secured to the bar 218 by a screw 224. A part 225 of the bar 218 is made separable and is arranged to be clamped against the cutter plate 216 by a screw 226. Inasmuch as the cutter plate is of substantially uniform thickness, it is seated angularly in the bar 218 in order to cause the portion of its edge 222 adjacent to the bender 170 to project further beyond the surface of the wear plate 222 than the more remote portions of its edge in conformity with the shape of the shoulder 220 on the gripper 104 against which the cutter 216 acts. Accordingly, the cutter plate 216 will remove a tapering sliver from the wire having its larger end severed from the portion of the wire adjacent to the bend formed by the bender 170. The side 227 of the cutter plate 216 contiguous to the bender 170 is disposed substantially in line with the inner surface of the recess 182, in consequence of which the shoulder A (Fig. 21) formed on the wire by the removal of the sliver is substantially in line with the surface B of the adjacent portion of the bend, which contacts with the inner wall of the recess and constitutes the upper surface of the nail in the nail string. In the operation of string nailing machines, the nails are usually severed from the nail string by a cutter movable along the upper surfaces of the heads of the nails. Consequently, the line of cut of the nail string when the nails are severed from the nail string by the string nailing machine will register with the shoulders A. The edge of the cutter 216 is preferably inclined downwardly away from the bender 170, as clearly appears from Figs. 18 and 19, so that the slivers will be removed from the wire by a draw cut. The slivers designated X (Fig. 7) fall into a chute 228 which conducts them from the machine. As shown, the cutter bar 218 (Fig. 5) is reciprocated by means of a roll 230 riding in a cam groove 232 in the side of the cam wheel 72.

Figure 8:
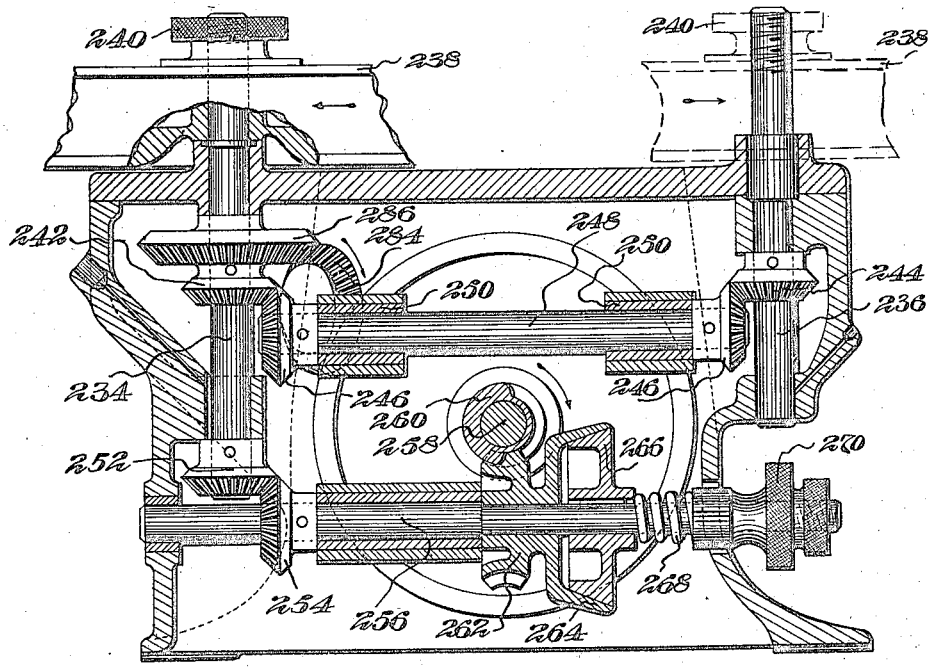
Fig. 8 is a transverese cross-section taken substantially along the line 8—8 of Fig. 1 and showing the mechanism for reeling the nail strings.

The nail strings are preferably reeled to facilitate their transport and the use of the nail strings in nailing machines, and to enable this operation to be performed, shafts 234 and 236 are journaled vertically in the machine frame 2 (see Fig. 8) and have their upper ends projecting from the top of the machine frame in position to receive reels 238. The reels 238 are secured to the shafts 234 and 236 for rotation therewith by nuts 240. The shafts 234 and 236 are provided with gears 242 and 244 respectively meshing with gears 246 on the ends of a shaft 248 journaled transversely of the machine frame 2 in bearings 250. Manifestly, with this construction, movement transmitted to either of the shafts 234 and 236 will be communicated to the other shaft. In the illustrated machine, the shafts 234 and 236 are operated by means of a gear 252 on the lower end of the shaft 234 which meshes with a gear 254 on a shaft 256 extending transversely of the machine frame 2 parallel to the shaft 248. The shaft 256 is driven from the main shaft 258 of the machine through the instrumentality of a worm gear 260 on the shaft 258 meshing with a worm wheel 262 formed integrally with a bowl-shaped member 264 having a cone-shaped pulley 266 pressed against its inner surface by a spring 268. The pulley 266 is keyed on the shaft 256 and transmits the movement of the member 264 frictionally to the shaft 256 and, consequently, to the reel shafts 234 and 236. Only one reel 238 is in use at any time, the provision of two reel shafts 234 and 236 enabling a nail string to be reeled on one of the shafts while a full reel is being removed from the other shaft and an empty reel placed thereon. In case any obstruction is interposed to the rotation of a reel on the shaft 234 or 236, the movement of the reel may be suspended by slipping of the bowl-shaped member 264 on the pulley 266. Moreover, the frictional drive provided by the mebers 264, 266, and the spring 268 enables the speed of rotation of the reels 238 to be reduced as nail strings are built up on the reels, it being apparent that as a nail string builds up on a reel, thus increasing the diameter of the cylinder on which the nail string is wound, a gradually lessening degree of angular movement of the shaft 234 or 236 is required to effect a uniform feeding movement of the nail string. The degree of friction between the bowl-shaped member 264 and the pulley 266 is preferably capable of being varied, and to this end I provide nuts 270 on the end of the shaft 256 which may be screwed inwardly or outwardly on the shaft, as desired, to increase or decrease the amount of friction between such parts.

Figure 9:
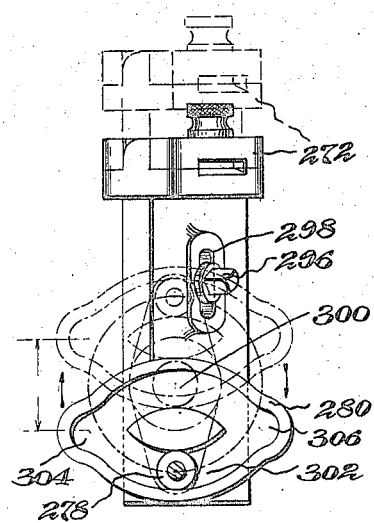
Fig. 9 illustrates the guide for laying the nail string on the reel viewed toward the right in Fig. 2.

The nail string is laid on the reel 238 by a guide 272 reciprocable vertically on a wall 274 (Fig. 2) constituting part of the machine frame 2, by a crank 275 mounted on the end of a shaft 276 and having a pin 278 received in a cam groove in the outer surface of an enlarged portion 280 of the guide 272. The shaft 276 derives its movement from a gear 284 meshing with a gear 286 fixed on the shaft 234. The guide 272 is preferably normally maintained in an intermediate position with respect to the sides of the reel 238 by springs 288 and 290 interposed between the ends of a channel in the wall 274 and a lug 292 on a plate 294 adjustably fixed to the guide 272 by a screw or the like 296 passing through an elongated slot 298 in the guide. Inasmuch as the shaft 276 is inclined to the median line of the frame of the machine, the crank 275 will be correspondingly inclined. Consequently, the cam portion 280 of the guide 272 is made wedge-shaped so that its grooved surface is disposed in substantially parallel relation with the opposed surface of the crank. The cam groove in the portion 280 of the guide 272 comprises two reversely arranged portions 300 and 302 concentric with the axis of the shaft 276 when the guide 272 is at its upper and lower limits of movement respectively. As indicated by the arrows in Fig. 9, the crank pin 278 moves toward the left in traversing the lower half of its path of movement. The portion 302 of the cam groove extends equally on both sides of the vertical plane of the axis of the shaft 276 and is less than 180° in arc value. Consequently, the crank pin 278 reaches the end of the concentric portion 302 before it has completed half of its upward movement from the position shown in Fig. 9. In order to permit the pin 278 to move outwardly as it continues its upward movement, the cam groove is enlarged outwardly at the point of communication of the concentric portions 300 and 302 as indicated at 304. Similarly, to the end that the crank pin may move outwardly after reaching the end of the portion 300 of the cam groove, the cam groove is correspondingly enlarged at 306. While the crank pin 278 rides in the concentric channel 302, the guide 272 is held down and the spring 290 is compressed, in consequence of which the spring 290 maintains the lower wall of the cam groove against the pin as the pin moves into the enlargement 304 of the cam groove. Conversely, when the crank pin 278 is in the concentric channel 300, the guide 272 is in raised position and the spring 288 is compressed, wherefore the spring 288 maintains the upper wall of the cam groove against the crank pin when it passes into the enlarged portion 306 of the cam groove. Consequently, the guide 272 is always under the control of the crank pin 278. As appears from Figs. 1 and 2, the guide 272 is located at some distance from the point where the nail string is wound on the reel. When the guide is down, the wire will be wound on the reel as shown in Fig. 1. The guide 272 is maintained in its downward position while the nail string is coiled on the reel at a gradual inclination from the top to the bottom of the reel. When the bottom of the reel has been reached, the crank pin 278 moves into the enlargement 304 of the cam groove in the guide 272, after which the continued movement of the crank pin causes the guide to be raised. The guide 272 dwells in its upward position while the crank pin 278 traverses the channel 302 during which time the nail string is coiled on the reel at a gradual inclination from the bottom to the top of the reel. The teeth on the gear 284 are slightly less in number than those on the gear 286 in order to cause the coils of the nail string to be laid side by side on the reel. Inasmuch as the friction clutch 264, 266 forms a part of the common driving connections for the reel 238 and guide 272, any suspension of the movement of the reel or other relative movement of the reel and its operating means does not affect in any way the relative movements of the reel and the guide 272.

The main shaft 258 of the machine is driven by tight and loose pulleys 306 and 308, the latter of which is arranged to be moved into engagement with the tight pulley 306 by a yoke 310 having wedge surfaces 312 which cause engagement of the loose pulley 306 with the tight pulley 308 upon downward movement of the yoke. In the present instance of the invention, downward movement of the yoke 310 to cause the main shaft 258 of the machine to be operated is effected by means of a lever 314 fulcrumed at one of its ends on the machine frame 2 at 316 and forked at its other end to receive an eccentric 318 provided with a handle 320 to facilitate its manipulation by the operator. The yoke 310 is raised to disconnect the loose pulley 308 from the fixed pulley 306 so as to stop the machine by means of a link rod 322 connected at one of its ends to one arm of the yoke 310 and at its other end to an arm 324 journaled on a stud shaft 326 projecting from the end of the machine frame 2. A spring 328, most clearly shown in Fig. 1, acts to move the arm 324 in a direction to lift the link rod 322. The arm 324 is extended beyond the stud shaft 326 and is forked to receive the brake 330 which is pivoted thereto in a position to operate on the periphery of a brake wheel 332 fixed on the shaft 258. In order that the machine may always stop at a predetermined point in the cycle of operations of the machine regardless of the time when the eccentric 318 is manipulated by the operator, the arm 324 is preferably formed with a further extension 334 carrying a roll 336 riding on the periphery of a cam 338 fixed on the shaft 258, the arrangement being such that so long as the roll 336 rides on the raised portion of the cam 338, the yoke 310 will not be raised to disconnect the tight and loose pulleys nor will the brake 330 be rendered operative on the brake wheel 332. The lever 314 is connected to the yoke 310 by a pin 339 received in a slot 340 of the lever. With this construction, when the arm 314 is moved downwardly by manipulation of the handle 320, the yoke 310 will be forced down to connect the loose pulley 308 with the fixed pulley 306. If, however, the handle 320 is manipulated to move the lever 314 upwardly at a time in the cycle of operations of the machine when the roll 336 rides on a raised portion of the cam 338, the slot 340 in the lever 314 permits relative movement of the lever and the yoke 310, and the machine will not be stopped until in the subsequent movement of the main shaft 258, the reduced portion of the cam 338 is brought into register with the roll 336, at which time the yoke 310 will be raised to disconnect the pulleys 306 and 308, and the pin 339 consequently moved to the upper portion of the slot 340.

Figure 13:
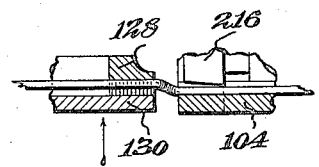
Fig. 13 is a cross-sectional view in elevation of the pairs of gripper members with the forward pair in the direction of feed of the wire in raised position.
Figure 21:
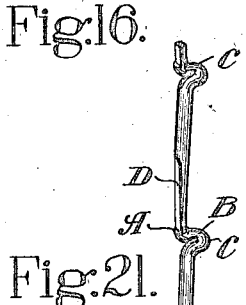
Figs. 21 and 22 show nail strings produced by the use of this invention.

The manner of operation of the illustrated machine will now be described. Assuming that the parts are in the positions shown in Fig. 10 with the grippers 104 and 118 withdrawn from the opposed grippers 102 and 120, the cutting edge 222 of the cutter plate 216 will be above the wire and the bender 170 will be drawn back to the position indicated in full lines in Fig. 5. In the continued operation of the machine, the grippers 104 and 118 are moved toward the grippers 102 and 120 respectively to clamp the wire between them at spaced points along the wire. The bender 170 is then projected inwardly against the wire to form an offset or bend in the wire located between the pairs of grippers 102, 104 and 118, 120 and in the horizontal plane of the recess 182 of the gripper 104, as indicated in Fig. 12. At the same time that the bender 170 operates on the wire, the grippers 118 and 120 are moved somewhat toward the grippers 102 and 104 to facilitate the bending of the wire by the bender 170. It should be understood, however, that the bend in the wire formed by the bender 170 is not entirely provided for by the movement of the grippers 118 and 120 toward the grippers 102 and 104, but results also from the stretching of the wire intermediate between the points of engagement of the wire by the pairs of grippers. When the bender is thrust against the wire, the bar 181 moves the plunger 96 against the tail of the dog 92 to release the grip of the dog on the wire. Inasmuch as the grippers are closed on the wire before the bender 170 is moved in, it follows that the dog 82 retains its hold on the wire until after the grippers have been closed upon it. The next step in the operation of the machine is the elevation of the grippers 118 and 120, as indicated in Fig. 13, thus offsetting the portion of the wire in advance of the bend with relation to the portion of the wire at the rear of the bend. The grippers 118 and 120 are then moved against the opposite sides of the grippers 102 and 104, thus closing the bend in the wire in the recess 182 of the gripper 104 to constitute the head C of a nail in the nail string (Fig. 21). The elevation of the portion of the wire in advance of the bend by the upward movement of the grippers 118, 120 and the subsequent movement of the pair of grippers 118, 120 into engagement with the pair of grippers 102, 104 causes the portion of the bend at one side of the angle of the bend to be bent in a plane transverse to the length of the wire with relation to the portion of the bend at the other side of the angle of the bend. The parts are then in the position shown in Fig. 14. After the head has been thus formed on a nail in the nail string, the cutter plate 216 is lowered to remove a sliver X from the wire at the rear of and adjacent to the head of the nail so as to form a point D on the next adjacent nail. The grippers 118 and 104 are then withdrawn from the grippers 102 and 118 respectively thus releasing the wire.

Figure 19:
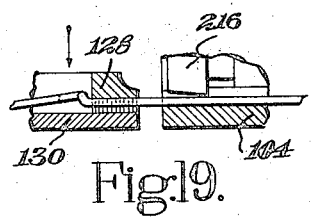

The slide 38 is moved back, and the dog 82 is released from the pawl 90 while the wire is engaged by the grippers. After the wire has been released by the grippers, the slide 38 is moved forward, thus causing the wire to be fed relatively to the grippers by the combined action of itself and the nail string reel 238. Inasmuch as the dog 82 on the slide 38 is not disengaged from the wire after its feeding movement until the grippers have been closed on the wire and is again engaged with the wire before the release of the wire by the grippers, the reel 238 can effect no movement of the wire except during the feeding movement of the slide 38. Consequently, the wire is always fed by equal amounts and the nails of the nail string are resultingly of equal length. The heads C of the nails in the nail string are formed on the under side of the portion of the wire engaged by the grippers 118 and 120, as clearly appears from Figs. 14, 16, and 17. Consequently, the channel 124 in the wire engaging face of the gripper 118 is spaced from the upper surface of the extension 122 by a distance slightly greater than the diameter of the wire in order to permit the head C to be fed between the grippers 118 and 120 when they are separated. After the wire has been fed, the pair of grippers 118, 120 is moved away from the pair of grippers 102, 104 to the positions shown in Fig. 17 and is then lowered as indicated in Fig. 19 thus completing a cycle of operations of the machine.

Figure 22:
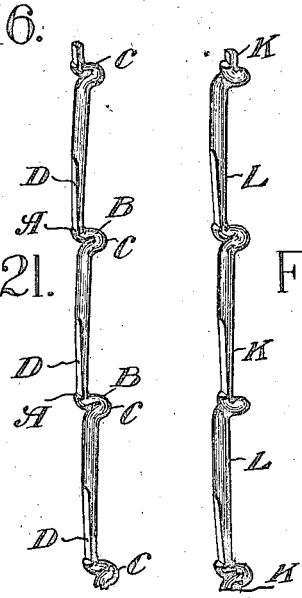
Figure 20:
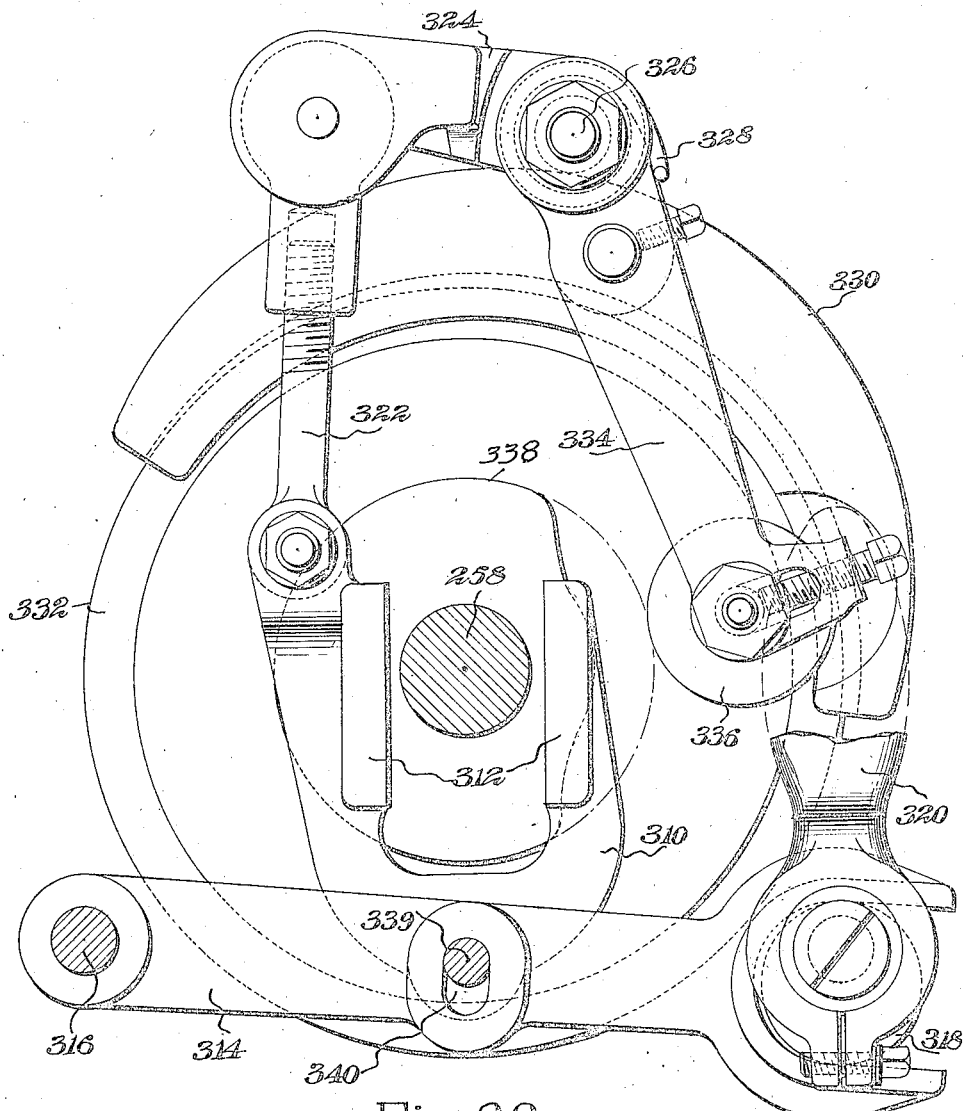
Fig. 20 is a view of the clutch mechanism taken substantially along the line 20—20 of Fig. 1 and looking in the direction of the arrows.

Inasmuch as in the operation of the machine, the portion of the wire in advance of the bend is raised as hereinbefore described following the formation of each of the bends, the nails of the nail string will be offset in the same direction from adjacent nails. For example, as shown in Fig. 21, the nails are offset toward the observer from the top to the bottom of the nail string. If desired, however, the cam track 210 of the cam wheel 72 may be so formed as to raise and lower the grippers 118 and 120 alternately after the operation of the bender 170 on the wire. In such a case, the nail string appears as shown in Fig. 22, in which alternate nails K are offset forwardly from the nails L.

Having thus described my invention, what I claim as new and desire to secure by Letters Patent of the United States is:—

1. That improvement in methods of making nail strings from strips of stock which comprises gripping a strip of stock at localities spaced along the length of the strip, and forcing the gripped portions of the strip toward each other to form a head for a nail of the nail string.

2. The method of making a nail string from a strip of nail stock which comprises doubling the strip upon itself at spaced intervals along the strip to constitute heads for the nails in the nail string.

3. The method of making a nail string from a strip of nail stock which comprises offsetting a portion of the strip to constitute the head of a nail in the nail string and then bending the offset portion of the strip in a plane transverse to the length of the strip.

4. The method of making a nail string from a strip of nail stock which comprises thrusting portions of the strip laterally at spaced intervals along the strip to constitute heads for the nails in the nail string, each consisting of portions extending outwardly from the strip and joined at their outer ends.

5. The method of making a nail string from a strip of nail stock which comprises thrusting a portion of the strip laterally of the strip to form a bend constituting the head of a nail in the nail string and then moving the parts of the strip at the sides of the bend toward each other to close the bend.

6. The method of making a nail string from a strip of nail stock which comprises thrusting a portion of the strip laterally to form a bend in the strip constituting the head of a nail in the nail string, moving the portion of the bend on one side of the angle of the bend with relation to the portion of the bend on the other side of the angle of the bend in a direction transverse to the length of the strip, and then moving the parts of the strip at the sides of the bend toward each other to close the bend.

7. The method of making a nail string from a strip of nail stock which comprises thrusting portions of the strip laterally at spaced intervals along the strip to form bends in the strip constituting heads for the nails in the nail string and removing slivers from the intermediate portions of the strip on one side of and adjacent to the bends of the strip, thereby to form points on the shanks of the nails.

8. The method of making a nail string from a strip of nail stock which comprises exerting a swaging pressure at spaced points along one side of the strip so as to cause portions of the strip to be offset from the other side of the strip at intervals along the strip greater than the distance between the angles formed by the offset portions with the strip.

9. The method of making a nail string from a strip of nail stock which comprises thrusting a portion of the strip laterally to form a bend in the strip constituting the head of a nail of the nail string and subsequently removing a portion of the strip rearwardly of and adjacent to the bend to form a point on the shank of the adjacent nail.

10. That improvement in methods of making nail strings from strips of stock which comprises gripping a strip of stock at localities spaced along the length of the strip, forcing the gripped portions of the strip toward each other to form a head for a nail of the nail string, and removing from the wire portion adjacent to the upper side of the head thus formed to shape a point for the succeeding nail.

11. A machine for making nail strings from strips of nail stock comprising members for gripping a strip of stock at spaced points along its length, and means for moving the gripping members toward each other to deform the strip.

12. A machine for making a nail string from a strip of nail stock comprising means for doubling the strip upon itself at spaced intervals along the strip to form heads on the nails of the nail string, and means for feeding the strip past the doubling means.

13. A machine for making a nail string from wire comprising means for forming folds in the wire at spaced intervals along the wire, such folds constituting the heads of the nails in the nail string, and means for feeding the wire past the folding means.

14. A machine for making nail strings from strips of nail stock comprising means for feeding the strips, means for gripping the strips at spaced points along the strips, and means for forming bends in the strips between the points of engagement of the strips by the gripping means.

15. A machine for making a nail string from a strip of nail stock comprising means for offsetting portions of the strip at spaced intervals along the strip to form heads for the nails in the nail string and means for shaping the offset portions of the strip.

16. A machine for making a nail string from a strip of nail stock comprising means for forming bends in the strip at spaced intervals along the strip to form heads for the nails in the nail string, and means for pressing the stock together at the bends to close the bends.

17. A machine for making a nail string from a strip of nail stock comprising means for forming bends in the strip and means for moving the parts of the strip on opposite sides of the bends toward each other simultaneously with the operation of the bending means on the strip.

18. A machine for making a nail string from a strip of nail stock comprising means for offsetting portions of the strip at spaced intervals along the strip to form heads on the nails in the nail string, and means for bending the offset portions of the strip in planes transverse to the length of the strip.

19. A machine for making a nail string from a strip of nail stock comprising means for gripping the strip at spaced points along the strip, means for offsetting a portion of the strip intermediate between the points of engagement of the strip by the gripping means to form the head on a nail in the nail string, and a cutter for removing a portion of the strip subsequent to the offsetting of the first-mentioned portion and rearwardly of and adjacent to the offset portion to form a point on the shank of a nail in the nail string.

20. A machine for making nail strings from wire comprising means for forming bends in the wire at spaced intervals along the wire to constitute heads for the nails in the nail string, means for moving the parts of the wire at the sides of the bends toward each other to close the bends, and a cutter for removing slivers from the wire rearwardly of the bends to form points on the shanks of the nails.

21. A machine for making a nail string from a strip of nail stock comprising means for forming angular bends in the strip spaced from each other by distances greater than that between the terminal angles of the individual bends and constituting the heads of the nails in the nail string, and means for feeding the strip past the bending means.

22. A machine for making a nail string from a strip of nail stock comprising means for feeding the strip and means operable on one side of the strip at spaced intervals along the strip to form offset portions on the opposite side of the strip spaced from each other by distances greater than that between the terminal angles of the individual offset portions, so that the offset portions are adapted to constitute the heads of the nails in the nail string and the portions of the strip between the offset portions are adapted to constitute the shanks of the nails in the nail string.

23. A machine for making a nail string from a strip of nail stock comprising gripper members operable upon the strip at spaced points along the strip and a bender operable upon the strip intermediate between the points of engagement of the strip by the gripper members to offset portions of the strip on the same side of the strip to constitute heads for the nails in the nail string.

24. A machine for making a nail string from a strip of nail stock comprising members for gripping the strip at spaced points along the strip, means for forming a bend in the strip between the points of engagement of the strip by the gripper members, and means for moving the gripper members toward each other during the operation of the bending means on the strip.

25. A machine for making nail strings from strips of nail stock comprising members for gripping a strip of stock at spaced points along its length, means for moving the gripping members toward each other to deform the strip, and means for removing a portion of the stock of the strip adjacent to the deformed portions to form points for the nail of the nail string.

26. A machine for making nail strings from strips of nail stock comprising members for gripping a strip of stock at spaced points along its length, means for moving the gripping members toward each other to deform the strip, and a cutter arranged to sever slivers from the wire adjacent to the deformed portions to form points on the nails of the nail string.

27. A machine for making a nail string from a strip of nail stock comprising pairs of gripper members operable on the strip at points spaced from each other, a bender operable upon the strips intermediate between the points of engagement of the gripper members therewith, and a cutter also intermediate between the gripper members and adjacent to the bender for removing slivers from the portions of the strip rearwardly of the bends of the strip to form points on the shanks of the nail in the nail string.

28. A machine for making a nail string from a strip of nail stock comprising pairs of gripper members operable upon the strips at spaced points along the strip, and mechanism intermediate between the pairs of gripper members for forming bends in the strip and removing slivers from the portions of the strip adjacent to one side of the bends to form points on the shanks of the nails in the nail string.

29. A machine for making nail strings from wire comprising pairs of gripper members operable on the wire at spaced points along the wire, a bender for offsetting portions of the wire intermediate between the points of engagement of the wire by the gripper members, and a cutter adjacent to the bender for removing slivers from portions of the wire adjacent to the offset portions of the wire to form points on the shanks of the nails in the nail string.

30. A machine for making nail strings from wire comprising pairs of gripper members operable on the wire at spaced points along the wire, a bender for offsetting portions of the wire intermediate between the points of engagement of the wire by the gripper members to form heads on the nails in the nail string, and a cutter adjacent to the bender for removing slivers from portions of the wire adjacent to the heads of the nails to form points on the shanks of the nails and constructed to form shoulders on the wire substantially in line with the upper surfaces of the heads of the nails.

31. A machine for making nail strings from wire comprising pairs of gripper members operable on the wire at spaced points along the wire, means for closing the pairs of gripper members substantially simultaneously on the wire, means intermediate between the pairs of gripper members for offsetting portions of the wire, and means for moving the pairs of gripper members toward each other to co-operate with said offsetting means to form the heads of the nails in the nail string.

32. In a machine for making a nail string from wire, the combination of pairs of gripper members operable on the wire at spaced points along the wire, means intermediate between the pairs of gripper members for forming bends in the wire, and means for moving the pairs of gripper members toward each other to close the bends made by the bending means thereby to form heads on the nails in the nail string.

33. In a machine for making a nail string from wire, means for feeding the wire, a stationary gripper member, a movable gripper member, means for operating the movable gripper member toward and from the stationary gripper member, a cutter slidably mounted in one side of the stationary gripper member for movement transverse to the path of movement of the wire through the machine, a second pair of gripper members spaced from the side of the first mentioned gripper members in which the cutter is mounted, means intermediate between the gripper members for offsetting portions of the wire to form heads on the nails in the nail string, and means for operating the cutter to remove slivers from the portions of the wire adjacent to and on one side of the offset portions to form points on the shanks of the nails in the nail string.

34. In a machine for making a nail string from a strip of nail stock, means for feeding the strip, means for gripping the strip comprising a gripper member having a recess in one of its sides extending transversely of the path of movement of the strip through the machine, and means for bending the strip into said recess.

35. In a machine for making a nail string from a strip of nail stock, means for feeding the strip, pairs of gripper members operable on the strip at spaced points along the strip, one of said pairs of gripper members comprising a member having a recess in one of its sides extending transversely of the path of movement of the strip through the machine, means for bending the strip toward said recess, and means for moving the pairs of gripper members toward each other to close the bend in said recess so as to form the head of a nail in the nail string.

36. In a machine of the class described, the combination of pairs of gripper members operable on a strip of nail stock at spaced points along the strip, means intermediate between the pairs of gripper members for forming bends in the strip, means for moving one of the pairs of gripper members in a direction transverse to the direction of movement of the strip through the machine to move the portion of the strip at one side of the bend with relation to the portion of the strip at the other side of the bend in a direction transverse to the length of the strip, and means for moving the pairs of gripper members toward each other to close the bends in the strip.

37. In a machine of the class described, the combination of pairs of gripper members operable on a strip of nail stock as spaced points along the stock, means for feeding the strips past the gripper members, means for opening the gripper members of the respective pairs of gripper members to permit feeding of the strips, and means intermediate between the gripper members for doubling the strips upon themselves at spaced intervals along the strips to constitute heads for the nails in the nail string.

38. In a machine of the class described, means for feeding a strip, means for offsetting the strip at spaced intervals along the strip to form heads on the nails in the nail string, and means operated by the offsetting means for controlling the operation of the feeding means on the strip.

39. In a machine for making nail strings from wire, the combination of a reciprocating member, a gripper carried by the reciprocating member, means tending normally to cause the gripper to clamp the wire, and means carried by the reciprocating member for retaining the gripper out of engagement with the wire.

40. In a machine for making nail strings from wire, the combination of a frame, a reciprocating member movable on the frame, a gripper carried by the reciprocating member, means tending normally to cause the gripper to clamp the wire, means carried by the reciprocating member for retaining the gripper out of engagement with the wire, and means carried by the frame for releasing the gripper from the control of the retaining means.

41. In a machine for making nail strings from wire, the combination of a frame, a reciprocating member movable on the frame, a gripper carried by the reciprocating member, means tending normally to cause the gripper to clamp the wire, means for moving the gripper out of operative engagement with the wire, means for retaining the gripper out of engagement with the wire, and means carried by the frame for releasing the gripper from the control of the retaining means.

42. In a machine of the class described, the combination of means for operating on a wire to form it into a nail string, and means for feeding the wire intermittently past the operating means comprising a member mounted for reciprocation toward and from the operating means, a gripper carried by said member, means for moving the gripper out of engagement with the wire when said member is at the limit of its movement toward the operating means, means for retaining the gripper means out of engagement with the wire during the movement of said member away from the operating means, and means carried by the machine frame for releasing the gripper from the retaining means when said member is substantially at the limit of its movement away from the operating means.

43. In a machine of the class described, the combination of means for operating on a wire to form it into a nail string comprising mechanism for forming bends at spaced intervals along the wire to constitute the heads of the nails in the string, means for feeding the wire intermittently past the bending mechanism comprising a reciprocating member, a gripper carried by the reciprocating member, means tending normally to move the gripper into engagement with the wire, means movably mounted on the machine frame for moving the gripper out of engagement with the wire when said member is substantially at the end of its movement toward the bending means, means for retaining the gripper out of engagement with the wire during movement of the member away from the bending means, means for releasing the gripper from the control of the retaining means substantially at the end of the movement of the member away from the bending means, and common means for operating the bending means and the means for moving the gripper out of engagement with the wire.

44. In a machine for forming nail strings from wire, the combination of a reel, a guide for laying the wire on the reel, a cam member carried by the guide, means for rotating the reel, and means operable by the reel rotating means for actuating said cam member.

45. In a machine for forming nail strings from wire the combination of a reel, a guide for laying the wire on the reel, a cam member operatively connected to the guide, means for rotating the reel, and means operable by the reel rotating means for intermittently actuating the cam member.

46. In a machine for forming nail strings from wire, the combination of a reel, a guide for laying the wire on the reel, a cam member operatively connected to the guide, opposed springs for normally retaining the cam member in a predetermined position, means for rotating the reel, and means for actuating said cam member.

47. In a machine for forming nail strings from strips of nail stock, the combination of a reel, a guide for laying the strips on the reel, a cam member operatively connected to the guide and having a slot composed of two communicating reversely arranged curved portions, and means for operating the cam member comprising a crank having a pin riding in said slot.

48. In a machine for making a nail string from a strip of nail stock, pairs of gripper members spaced from each other for engagement with the strip at spaced points along the strip, means for feeding the strip through the gripper members, means for moving said pairs of gripper members toward each other in a direction parallel to the path of movement of the strip through the machine, and means for moving one of said pairs of gripper members in a direction transverse to the path of movement of the strip.

In testimony whereof I have signed my name to this specification.

JAMES A. BROGAN.